United States Patent [19]

Hielscher

[11] Patent Number: 5,550,338
[45] Date of Patent: Aug. 27, 1996

[54] DISPOSABLE THERMAL SHIELD

[75] Inventor: Peter Hielscher, Röthis, Austria

[73] Assignee: Matec Holding AG, Kusnacht, Switzerland

[21] Appl. No.: 453,106

[22] Filed: May 30, 1995

Related U.S. Application Data

[63] Continuation of Ser. No. 789,017, Nov. 6, 1991, abandoned.

[30] Foreign Application Priority Data

Nov. 12, 1990 [CH] Switzerland .................. 03583/90

[51] Int. Cl.[6] .................................................. E04B 1/82
[52] U.S. Cl. ........................ 181/290; 181/291; 181/294
[58] Field of Search ................................. 181/207, 284, 181/286, 287, 290, 291, 294

[56] References Cited

U.S. PATENT DOCUMENTS

| | | | |
|---|---|---|---|
| 4,709,781 | 12/1987 | Scherzer | 181/290 |
| 4,735,284 | 4/1988 | Gahlau et al. | 181/290 |
| 4,825,974 | 5/1989 | Hoffmann et al. | 181/290 |
| 4,828,932 | 5/1989 | Morimoto | 181/292 |
| 5,192,624 | 3/1993 | Morimoto | 181/290 |
| 5,196,253 | 3/1993 | Mueller et al. | 181/290 |

FOREIGN PATENT DOCUMENTS

| | | |
|---|---|---|
| 439432 | 1/1991 | European Pat. Off. . |
| 87009196 | 4/1987 | Germany . |

OTHER PUBLICATIONS

"Aerogels", Proc. First Int. Symp, J. Fricke, 1985 (no month).

*Primary Examiner*—M. L. Gillner
*Assistant Examiner*—Eddie C. Lee
*Attorney, Agent, or Firm*—Antonelli, Terry, Stout & Kraus

[57] ABSTRACT

The present thermal shield comprises, in essence, a dimensionally stable substrate (2) on which is disposed a sound-absorbing thermal insulating layer (3). This thermal insulating layer is provided with a protective coating (4). According to the disclosure, all layers of the thermal shield consist of a light metal, particularly of aluminum or an aluminum alloy. For acoustic reasons, the thermal insulating layer is made up of an open-pore structure, especially of aluminum wool. In a further development, the thermal insulating layer is made up of several plies, and the dimensionally stable substrate (2) is perforated. A thin protective layer (5) acting as a foil absorber is arranged between the substrate (2) and the thermal insulating layer (3). This thermal shield is utilized with preference in the automobile industry.

15 Claims, 1 Drawing Sheet

DISPOSABLE THERMAL SHIELD

This application is a Continuation Application of Ser. No. 07/789,017 filed Nov. 6, 1991, which is now abandoned.

TECHNICAL FIELD

The present invention concerns a disposable thermal shield, especially for the insulation of vehicle floor parts, with a dimensionally stable substrate carrying a sound-absorbing thermal insulating layer, this thermal insulating layer being provided with a protective coating at least on its side facing away from the substrate.

BACKGROUND ART

Such heat shields are utilized, inter alia, in the automobile industry in order to line, for example, the floor portion of a vehicle at least in part. Since, with the nowadays customary use of catalysts, the temperatures of the exhaust gases and of the exhaust pipes are greatly increased, such linings have presently become quite popular. Consequently, the disposal of these thermal shields has gained special significance.

Thermal shields as known heretofore consist essentially of a relatively thick formed sheet-metal part having high thermal reflectivity, preferably of aluminum, to which is applied a heat-absorbing insulating layer equipped with a protective foil. The insulating layer utilized herein consists usually of ceramic wool, rock wool, or glass wool, or, respectively, of such foams. Such a thermal shield has been disclosed, for example, in DE-U-87009919.6.

In order to render these thermal shields also acoustically active, it has likewise been proposed to partially perforate the substrate in order to obtain acoustic coupling of the sound waves onto the insulating material of the thermal insulating layer. Such an acoustically effective thermal shield has been described, for example, in Swiss Patent Application 188/90-7. The heat shield disclosed in this application has thermal insulating layers of mineral or ceramic materials, of natural or inorganic materials, or mixtures thereof, optionally also with suitable additives. In particular, mineral foams or ceramic fibrous mats or glass fiber mats, respectively, are used at present for such thermal shields.

These thermal shields, however, can be disposed of for reuse, e.g. recycling only with great effort since the materials utilized for their construction are chosen differently, depending on the manufacturer, and therefore must be individually separated and subjected to a troublesome sorting process in correspondence with the various materials before the materials can be reused, e.g. recycled.

DISCLOSURE OF INVENTION

It is, therefore, an object of the present invention to provide a disposable thermal shield avoiding the disadvantages of the conventional devices.

In particular, a thermal shield is to be created which need not be separated for disposal purposes for reuse, e.g. recycling of the material thereof, and which can be manufactured in a simple way from a readily disposable material.

According to the invention, this object has been attained with a thermal shield of the type discussed above, characterized in that the dimensionally stable substrate, the sound-absorbing thermal insulating layer, and the protective coating consist of the same material, especially a light metal.

Readily disposable metals are adequately known to a person skilled in the field of waste product utilization and are basically suited for producing the thermal shields according to this invention.

In a first preferred embodiment, the thermal insulating layer consists of an aluminum-containing structure which is to say that the thermal insulating layer can also consist of reprocessed aluminum. It is understood that, for producing the thermal shield according to this invention, the requirements as to the purity of the reprocessed aluminum need not be very high, and the aluminum can also contain impurities within limits.

In this connection, the thermal insulating layer can also exhibit, as is conventional, a foam-like or fibrous structure.

However, it is understood that the heat insulating layer can also have a shredded or flaky structure, as is known from recycled materials.

In the preferred embodiment, the thermal insulating layer consists of a commercially available aluminum wool, or of several layers of this aluminum wool, separated by thin aluminum foils. The use of aluminum meshwork has also proven to be especially advantageous for producing the thermal shields of this invention. Such meshwork materials are customary in the trade and are made, for example, of aluminum strips or threads having a width of about 1 mm. These meshwork materials have a mesh of about 5 mm in length and are offered as yard goods. When using these meshwork fabrics as a thermal insulating layer, they are introduced in multiple plies between the substrate and the protective coating.

The multiple-layer thermal insulation having the structure set out above exhibits improved sound and heat-insulating properties and is structured in correspondence with the technical requirements. In particular, this multiple-layer thermal insulating ply is, in accordance with the intended purpose, quilted, embossed, or glued together. Aerogels prove to be also particularly advantageous; these are utilized in the present multiple-layer thermal insulating ply, for example, in the form of thin films, as granules, flakes, powders, or foam.

In a further development of the thermal shield according to this invention, the substrate is at least partially perforated in order to create an acoustically effective heat shield. In this connection, attention is once again invited to Swiss Patent Application 188/90-7 wherein a thermal shield is disclosed having fine-pore foils.

Additional preferred features of the shield according to this invention can be derived from the claims.

The invention will be described in greater detail below with reference to an embodiment and with the aid of the figures.

BEST MODE FOR CARRYING OUT THE INVENTION

Figure 1:
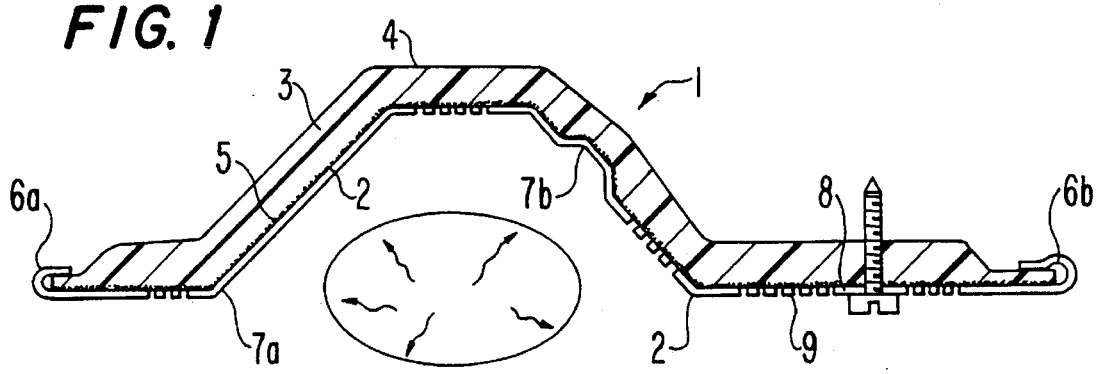
FIG. 1 is a cross section through a schematically illustrated thermal shield of a conventional type.

The thermal shield 1 illustrated in FIG. 1 consists essentially of a perforated substrate 2 with a good reflectivity for heat radiation and preferably also with a good thermal conductivity, and of a sound-absorbing thermal insulating layer 3 of mineral or ceramic materials of natural or inorganic fibers or of mixtures of these substances with "Teflon" or other commercially available materials; this thermal insulating layer 3 is provided with a protective coating 4, 5.

Customarily, an aluminum sheet having a thickness of between 0.2 mm and 1.2 mm is utilized for the substrate 2. The thermal insulating layer can consist, for example, of a mineral foam, a ceramic fiber mat, or a glass fiber mat, and can have a thickness of 5 mm to 15 mm. The protective cover can be an aluminum sheet or a thin aluminum foil 4, and also a coating 5 applied by the metal spraying technique. Preferably, the foil or the sprayed-metal coating exhibits on the side facing the perforated substrate a thickness of less than 30 μm whereas the protective coating on the side facing away from the perforated substrate can have a thickness of 0.05 mm up to 1.2 mm.

In these commercially available thermal shields, the individual layers, covers or foils are, at least in part, glued together, stitched together, welded together, or clamped into the flanged edge.

The substrate 2 need not be perforated in all regions. In particular, the marginal zones 6a, 6b, which are flanged over, are devoid of perforations 9. The angular deformation zones 7, such as, for example, the bends 7a and crimps 7b, are likewise fashioned to he free of perforations. Essential perforation-free partial zones are predetermined by the fastening zones 8.

Thermal shields having such a structure thus consist of a plurality of very different materials, for example aluminum for the substrate, ceramic wool for the insulating layer, heat-resistant adhesives for bonding these layers, and galvanized staples for the stapled attachments.

Consequently, the conventional thermal shields prove to be difficult in their disposal, especially since they must first be separated, sorted, and cleaned by means of appropriate methods before their material can be reused, e.g. recycled.

Figure 2A:
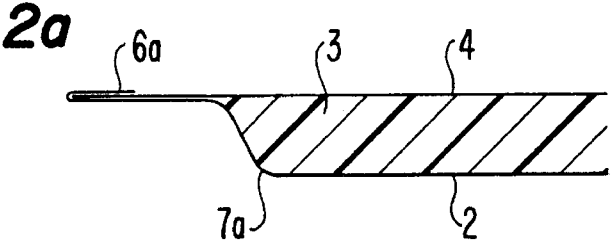
FIGS. 2a, b, c and d each shows a cross section through an end piece of various embodiments of a thermal shield in accordance with this invention.

The cross section of a thermal shield according to this invention, illustrated in FIG. 2a, shows this shield in its simplest example with a dimensionally stable substrate 2 carrying a sound-absorbing thermal insulating layer 3, this thermal insulating layer 3 being provided on its side facing away from the substrate 2 with a protective cover 4; these various layers and/or coatings of the thermal shield are produced from a light metal. In particular, in a preferred embodiment, an aluminum sheet having a thickness of 0.3 to 1.5 mm is utilized as the dimensionally stable substrate 2. The thermal insulating layer 3 consists, in this embodiment, of an aluminum wool having a weight per unit volume of 30 to 100 kg/m$^3$. An aluminum foil having a thickness of 0.05 to 0.2 mm serves as the top protective cover.

A thermal insulating layer especially suited for producing the thermal shields according to this invention consists of an aluminum meshwork. This metallic meshwork can be deformed without any problems in all three dimensions and can be tightly packed or loosely placed in dependence on the local requirements.

Figure 2B:
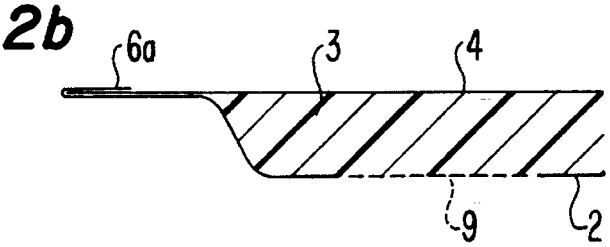

FIG. 2b shows an acoustically active embodiment of the thermal shield of this invention, distinguished with respect to the above embodiment by an at least partially perforated substrate 2. It is understood that the size and distribution of these perforations are optimized in correspondence with the source of the noise.

Figure 2C:
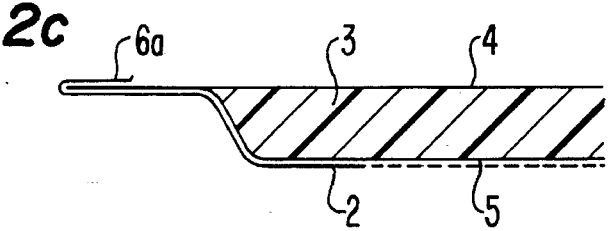

In a preferred embodiment, as illustrated in FIG. 2c, a thin aluminum foil of 0.01 to 0.02 mm in thickness, acting as a foil absorber, is disposed between the thermal insulating layer 3 and the partially perforated substrate. In a simple way, this foil can also be replaced by a spray-metalized coating or a firm and porous skin produced by fusion.

Figure 2D:
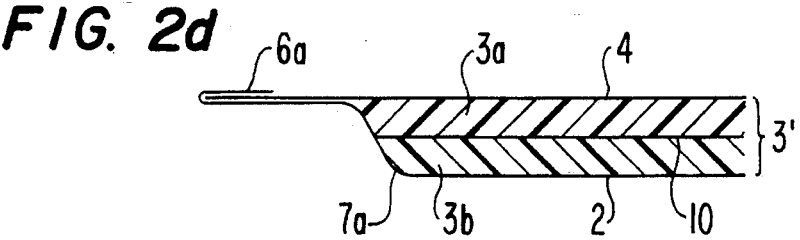

An essential criterion for the acoustic effectiveness of the present thermal shield is the porosity of the individual layers. In a special further development of the thermal shield according to this invention, aluminum foils are utilized wherein the pores are formed especially by means of a needle roll. The thus-produced pores exhibit crown-shaped ruptures or, respectively, perforation protrusions which ensure that the foils formed with these perforation protrusions do not rest flat on the adjacent foil or layer but rather are spaced apart therefrom, thus improving the acoustic efficacy of the thermal shield of this invention. It is understood that the geometry and dimensioning of these perforation protrusions can be optimized in a simple way by a person skilled in the art. Such foils with unilaterally or bilaterally formed perforation protrusions are utilized, in particular, as interlayers in the multi-ply thermal insulating layer and can be present therein singly or as an ensemble. FIG. 2d shows such an embodiment wherein plies 3a and 3b of the thermal insulating material are employed with an interlayer of such a foil 10 formed with perforation protrusions (not shown) to form the multi-ply thermal insulating layer 3'.

In any event, a person skilled in the art should select, from the materials available, i.e. light metals or their alloys, such a material which, inter alia, is nontoxic, corrosion-resistant, exhibits good thermal reflectivity properties, and can be readily shaped. In particular, for thermal shields as used in the automobile industry, a material is to be normally selected having a melting point of above 600° C. This is necessary for affording adequate safety even under unfavorable utilization conditions.

For acoustic reasons, structures are chosen, in particular, which are open-pore and exhibit a high modulus of elasticity and, respectively, a high loss factor. Their absorption effectiveness, i.e. their porosity and elasticity, are optimized especially in the range of 80 dB, i.e. between 70 dB and 90 dB.

In this connection, aerogels have proven to be material additives especially suitable for this purpose. Aerogels are extremely lightweight and porous substances with extraordinarily good heat- and sound-damping properties and are well known to a person skilled in the art, for example from "Aerogels", Proc. First Int. Symp. 1985.

These aerogels can be applied, in particular, in foil shape between the individual plies of the thermal insulating layer, or they can be used in the present thermal insulating layer as compounds applied to aluminum wool or aluminum foil. Aerogels can, however, also be employed for the thermal shield of this invention in the form of hard foam, flakes, powder, or granules. For this purpose, the corresponding plies of the thermal insulating layer are shaped in the manner of cushions.

Preferably, the entire thermal insulating layer is quilted for improving the long-term dimensional stability. Also suitable proved to be embossings, creased structures, or glued structures, imparting to the thermal insulating layer a quilt-like appearance. The essential criterion here is the formation of cushion-like zones dimensioned in correspondence with the technical requirements.

All items having porous structures can be used as the thermal insulating layer, such as, for example, non-woven mats, wool, frayed fibers, fabrics, oriented or random fiber arrays, multi-ply or single coatings, chips, strips, spirals, flakes, foams, granules, or conglomerates.

It is understood that recyclable adhesives are utilized for bonding the individual layers, i.e. adhesives satisfying the regulations concerning disposable waste products.

In particular, aluminum foils are used coated with hot-melt adhesives to facilitate assembly. Thus the continuously manufactured thermal insulating layer, or multi-ply thermal insulating layer, can be glued together in the manner of a quilt in a simple way and can be brought into a form suited for the manufacture of the thermal shields.

In the well-proven embodiment, the substrate 2 is flanged in order to hold the various layers and/or coatings or foils together. This means for holding or flanging step obviates the need for other fastening agents, such as, for example, rivets, staples, or weld seams which, in essence, consist again of different materials.

The advantages of the thermal shield described herein are obvious. In particular, local temperature differences are rapidly compensated for, thus preventing local destruction of the components to be protected. Furthermore, a thermal shield fashioned in this way has a heat resistance of up to 660° C., withstands chemical stresses as usual in case of vehicles, i.e. is resistant against salt, oil, tar contaminations, grease, or acids, and exhibits a low weight. The preferred embodiment with the flange permits an economical production and a simple and safe assembly.

Additional embodiments of the thermal shield according to this invention are within the purview of the ordinary technical manipulations of a person skilled in the art. In particular, it is possible to arrange additional layers between the substrate and the thermal insulating layer or between the thermal insulating layer and the top protective cover 4. The thermal insulating layer can be built up of a single ply, or several plies as shown in FIG. 2d. In particular, all imaginable combinations of the aforedescribed individual layers are suitable as a structure for the thermal shield according to this invention, for example Al foil/Al wool/Al foil/Al foil/Al wool or Al foil/Al meshwork/Al wool/Al foil or Al foil/Al meshwork/aerogel/Al foil or Al foil/Al foil/Al foil/Al foil/Al foil or Al foil/aerogel/Al foil etc.

The above-described sound-absorbing thermal shields can be utilized in connection with vehicles, especially motor vehicles, just as well as in connection with building machines or industrial machines, and can be mounted to any desired bottom parts, or, respectively, to the floor panel, front panel, or roof panel.

In particular, all of the above embodiments can be utilized in combination with conventional sound-absorbing parts. Thus, the thermal shield of this invention—especially in its embodiment with the aluminum meshwork—can be inserted without any problems in correspondingly recessed sound-insulating parts, or can be placed onto such parts. Suitable connecting means, such as clips, adhesives, etc., are adequately known to a person skilled in the art and do not form a subject of the present invention. It is likewise understood that the thermal shield according to the invention can replace conventional sound-protective parts entirely, thanks to its inherent stability and ready disposability. Especially suited for this purpose is the region of the engine compartment, particularly the end wall zone. Also its use as a mere sound-absorbing part is self-evident to one skilled in the art.

I claim:

1. A disposable, sound-absorbing vehicle thermal shield for the acoustic and thermal insulating of vehicle parts, said shield consisting essentially of a relatively thick, partially perforated, dimensionally stable substrate in the form of a sheet of metal, a multi-ply, sound-absorbing thermal insulating layer built up of several plies of a light metal material having an open pored structure with a porous metal foil being provided between plies thereof as an interlayer of said insulating layer, said thermal insulating layer being carried by said substrate, a protective cover in the form of a relatively thin layer of a light metal provided at least on a side of said thermal insulating layer facing away from the substrate, and means for holding together said dimensionally stable substrate, said sound-absorbing thermal insulating layer and said protective cover, and wherein said dimensionally stable substrate, said multi-ply, sound-absorbing thermal insulating layer, and said protective cover layer are each manufactured from the same material, namely a readily disposable light metal having a melting point above 600° C. whereby the thermal shield is readily disposable for recycling the material thereof without separation from one another and sorting of said dimensionally stable substrate, said multi-ply, sound-absorbing thermal insulating layer and said protective cover layer.

2. Vehicle thermal shield according to claim 1, wherein the thermal insulating layer is built up of several plies and comprises at least one ply of aluminum wool.

3. Vehicle thermal shield according to claim 1, wherein the thermal insulating layer is built up of several plies and comprises at least one ply of an aluminum meshwork.

4. Vehicle thermal shield according to claim 1, wherein the thermal insulating layer is built up of several plies and comprises at least one ply of aerogel.

5. Vehicle thermal shield according to claim 1, wherein the thermal insulating layer is built up of several plies and comprises as said porous metal foil at least one foil provided with perforation protrusions.

6. Vehicle thermal shield according to claim 1, wherein the thermal insulating layer is shaped in the manner of a quilt.

7. Vehicle thermal shield according to claim 1, wherein the substrate consists of an aluminum sheet with a thickness of 0.3 to 1.5 mm.

8. Vehicle thermal shield according to claim 7, wherein the aluminum sheet is partially perforated.

9. Vehicle thermal shield according to claim 8, wherein a thin protective layer of an aluminum foil having a thickness of 0.01 to 0.02 mm lies between the perforated aluminum sheet and the thermal insulating layer.

10. Vehicle thermal shield according to claim 7, wherein the protective cover is an aluminum foil having a thickness of 0.05 to 0.2 mm.

11. Vehicle thermal shield according to claim 1, wherein said means for holding together is also formed from said readily disposable light metal.

12. Vehicle thermal shield according to claim 1, wherein said several plies of said sound-absorbing thermal insulating layer are glued together with recyclable adhesive.

13. Vehicle thermal shield according to claim 1, wherein said readily disposable light metal is aluminum.

14. Vehicle thermal shield according to claim 1, wherein said protective cover layer is a coating of said readily disposable light metal applied to at least said side of said thermal insulating layer facing away from said substrate.

15. Vehicle thermal shield according to claim 1, wherein said protective cover layer is a foil made of said readily disposable light metal.

* * * * *